United States Patent [19]

Hogg

[11] 3,783,390
[45] Jan. 1, 1974

[54] AXIAL TRAJECTORY SENSOR HAVING GATING MEANS CONTROLLED BY PULSE DURATION MEASURING FOR ELECTRONIC PARTICLE STUDY APPARATUS AND METHOD

[76] Inventor: Walter R. Hogg, 15930 Dornock Round, Miami Lakes, Fla. 33014

[22] Filed: Feb. 9, 1971

[21] Appl. No.: 113,920

Related U.S. Application Data

[63] Continuation-in-part of Ser. Nos. 84,440, Oct. 27, 1970, and Ser. No. 101,325, Dec. 24, 1970.

[52] U.S. Cl. ............... 328/111, 328/92, 324/71 PC
[51] Int. Cl. ....................... H03k 5/20, G01n 27/00
[58] Field of Search .......................... 307/234, 267; 328/111–117, 146, 149; 324/71 PC; 235/92 PC, 151.3, 151.31

[56] References Cited
UNITED STATES PATENTS

| | | | |
|---|---|---|---|
| 2,996,624 | 8/1961 | Mumma | 328/116 UX |
| 3,502,973 | 3/1970 | Coulter | 235/92 PC |
| 3,548,206 | 12/1970 | Ogle et al. | 328/116 X |
| 3,553,593 | 1/1971 | Gedance | 328/112 |
| 3,557,352 | 1/1971 | Hogg et al. | 235/151.3 |
| 3,600,688 | 8/1971 | Booth | 328/111 |
| 2,704,957 | 3/1955 | Miessner | 84/1.15 |
| 2,968,011 | 1/1961 | Schouten et al. | 333/20 |
| 2,996,624 | 8/1961 | Mumma | 250/218 |
| 3,255,293 | 6/1966 | Walker | 84/1.10 |
| 3,289,195 | 11/1966 | Townsend | 340/324 |
| 3,399,311 | 8/1968 | Andrea | 307/225 |
| 3,454,792 | 7/1969 | Horlander | 307/261 |

*Primary Examiner*—John W. Huckert
*Assistant Examiner*—B. P. Davis
*Attorney*—Silverman & Cass, I. Irving Silverman, Myron C. Cass, Sidney N. Fox, Gerald R. Hibnick and Herbert J. Singer

[57] ABSTRACT

A sensor for use with apparatus operating in accordance with the principles of the Coulter electronic particle studying device, for differentiating between particles passing on axial or near axial paths through an aperture and particles passing off center. The duration of each particle pulse produced by a particle passing through the aperture is measured at some fraction of the amplitude of an artificial pulse produced in the apparatus and only those particle pulses whose thus-measured durations meets the criterion of duration established by the electronic circuitry are permitted to pass for use in pulse height analysis following the sensor. Each artificial pulse is produced from each particle pulse by choosing as the amplitude of said artificial pulse the amplitude of the particle pulse at substantially the instant that the particle causing the same is halfway through the aperture of the particle studying device, and for this purpose electronic circuitry is provided for finding the center of the particle pulse. This is done for all particle pulses, irrespective of their durations, but only pulses which have durations that meet the criterion established by the circuitry are passed, the others being discarded on the basis of their longer durations. The apparatus provides structure for deriving a duration-measuring pulse whose duration is that of the artificial pulse at its fractional amplitude, converting the signal into one which has an amplitude proportional to duration, and then subjecting the latter signal to the criterion of duration established as an amplitude level to operate gating means automatically for rejecting the longer duration pulses and passing the shorter duration pulses.

49 Claims, 5 Drawing Figures

PATENTED JAN 1 1974 3,783,390

INVENTOR
WALTER R. HOGG

By Silverman & Cass
ATTORNEYS

AXIAL TRAJECTORY SENSOR HAVING GATING MEANS CONTROLLED BY PULSE DURATION MEASURING FOR ELECTRONIC PARTICLE STUDY APPARATUS AND METHOD

CROSS REFERENCE TO RELATED APPLICATIONS

This application is a continuation-in-part of the following applications:

an application bearing the same title, Ser. No. 84,440 filed Oct. 27, 1970, hereinafter referred to as the first application; and a second application bearing the same title, Ser. No. 101,325 filed on Dec. 24, 1970, hereinafter referred to as the second application.

The above applications are filed in the name of the applicant herein and assigned to a common assignee.

BACKGROUND OF THE INVENTION

The field of this invention is particle analyzing apparatus and more particularly is concerned with apparatus in which studies may be made of particulate systems using the Coulter sensing principal in a manner to obtain more accurate size information than heretofore achieved.

This invention has basic objectives common with those of the first and second of the above-referred to applications. In those applications, there is detailed the complete background of the invention in connection with specific explanations of the theory and operation of the Coulter apparatus disclosed in U.S. Pat. No. 2,656,508 which issued Oct. 20, 1953 to Wallace H. Coulter. Accordingly, only a brief discussion of the Coulter principle and its relation to this invention will be made.

Particles passing in a suspension through an aperture from one body of fluid to another will produce electrical signals in an electric circuit including the aperture as an impedance element of that circuit. Thus, there is one signal for each particle and the true amplitude of each signal is quite faithfully proportional to the size of the particle producing the same. Apart from the problems of coincidental passage of multiple particles through the aperture, it is possible to count the electrical particle pulses and obtain information on the concentration thereof in the suspension, and it is possible to make size studies by the use of pulse height analyzing circuitry acting upon those particle pulses.

The particle pulses produced by particles which pass through the center of the aperture as explained in the first and second co-pending applications will most accurately represent the particle size. These pulses are bell-shaped and generally quite symmetrical. Particle pulses produced from particles which pass off center tend to have greater durations and may have peaks on the front of the pulse and quite often on both the front and back thereof. These peaks are overshoots which are caused by the particles passing through regions of high current density, these latter being at corners of the aperture. Accordingly, their amplitudes are not true measures of size and in size studies these particle pulses will produce false information. The farther off axis the particle path, the longer and less accurate the corresponding pulses are. In the first and second co-pending applications, structures and methods are described for discarding these pulses on the basis of their greater durations. The structure of the invention herein also does this, but there is another problem which the invention herein solves and which is not described in said first and second co-pending applications.

Many of the particles which pass through the aperture will enter off center, even close to a corner, and then will move to the center and finally pass out close to the center. This type of particle will produce a pulse which has a duration nearly the same as the duration of pulses produced by particles passing through the center. It will not be discarded by the circuitry of the first and second co-pending applications, but it may have a peak or overshoot, usually on the front edge, the amplitude of which is not a true measure of the size of the particle. In the axial center of the aperture, the electric field of the aperture is most uniform, and when the particle passes through this region, its amplitude will be most closely proportional to the size of the particle producing the same.

Hereinafter there is described structure for finding the center of the pulse, which will be at an amplitude lower than any peak on the leading or trailing edge. This information is used in the invention herein to derive an output pulse whose amplitude is proportional closely porportional to the size of the particle which produced the particle pulse. Although reference to the specification herein will give the details of the method, a brief discussion on the manner in which particles pass through an aperture will be of value at this point.

Since particles are distributed at random throughout a suspension to be studies by a Coulter particle analyzing device, and since the particles are distributed randomly throughout the electrolyte, there is an equal probability that a particle will enter the aperture at any given position on the cross section of the entrance. Thus, about half of the particles will enter in a centrally located cylindrical region having a diameter 0.707 of the aperture diameter. 75 percent of them will enter a similar region 0.866 of the aperture diameter. Since the laminar flow has not developed at the entrance of the aperture, the particles will all be going at approximately the same speed at the entrance, although as they pass through, there will be a slight reduction in speed for those particles which pass through close to the wall of the aperture, this decrease in speed becoming quite marked as to particles which are very close to the wall. The reduction in speed of passing particles means that the duration of the electric pulses which are produced by them will be greater than those which pass through the center, and it is this difference which enables the apparatus of the first and second co-pending applications as well as that of this application to discriminate against them.

As mentioned above, particles which pass through off the axis of the aperture will be likely to pass through areas of high current density, since there is an electric current in the aperture while the particles in suspension are passing through. The areas which are the highest are those in the vicinity of the sharp corners formed at the entrance and exit of the conventional aperture. If the particles pass through such region or regions and also pass closely to a wall while traversing the aperture, it is not material that the resulting particle pulse will have peaks or overshoots since its greater than normal duration will cause the circuitry of the first and second co-pending applications and as well the structure of the application herein to discard the same. It will occur, however, that there are many particles whose speed is not materially reduced notwithstanding that they suffer the addition of a peak or overshoot on their leading edges and sometimes on both leading and trailing edges. These particle pulses will not be discarded in the circuitry of the first and second co-pending applications, hence when such a pulse or derived pulse emerges from the output of the circuits of such co-pending applications, it will have a false amplitude. Sizing studies made with such pulses will be inaccurate, as stated above.

Since the electric field in the center of the aperture, measured along the axis from front to rear, is the most uniform, particle pulses which are produced by most particles will have an amplitude at the center of the pulse which quite closely is proportional to the size of the particle causing the same. This is irrespective of the presence of peaks or overshoots.

The invention herein makes pulse measurements with respect to the amplitude of all pulses at the instant the corresponding particle is halfway through the aperture, hereinafter called their center amplitudes, hence it will discard the longer pulses and pass the shorter pulses, even if these shorter pulses are peaked at their leading and/or trailing edges.

Combining the circuitry of the center finder structure with the teachings of the first and second copending applications, the invention herein achieves a structure which discriminates against longer duration pulses and which produces an output consisting of a train of pulses whose amplitudes are equal to the center amplitudes of the respective particle pulses from which the same are derived.

SUMMARY OF THE INVENTION

According to the invention, particles passing through an aperture are examined electronically to ascertain which of them passed most nearly on axial paths through the aperture. These particles are the only ones which are permitted to be regarded by the apparatus, the others being disregarded. The discrimination is achieved by considering the respective durations of the particle pulses which are produced by the particles while traversing the aperture, those passing off the axis normally having longer durations.

In addition, the amplitudes of the particle pulses are measured only at their centers, thus disregarding the peaks or overshoots produced in some cases, but giving a more accurate measure since in all cases the peaks and overshoots are caused by the particle passing through regions of high current density and are not true amplitudes proportional to size.

A low threshold is used to trigger the timing cycle in order to find the center of each particle pulse. An integrator is turned on which integrates the pulse. Since the output of the integrator is proportional to the area of the pulse, it rises at a rate which is linearly related to the size of the particle. When the amplitude of the integrator output, properly amplified or attenuated by suitable means, becomes equal to the original pulse, a comparator triggers a univibrator which turns on an analog gate or electronic switch connecting the output terminal either to the amplifier having the particle pulse at its output or to the output of the integrator. Since by adjustment these voltages are equal, either one may be used from which to derive the output pulse.

The arrangement is made possible by the fact that the particle pulse is flat on top in its center, that is, when the particle producing the same is halfway through the aperture. Thus, minor timing accuracies are unimportant, and, in addition, the fact that the areas under the peak and of the skirts of the particle pulse are small with respect to the major portion of the pulse means that there is not sufficient contribution to the total area to affect appreciably the output of the integrator.

Thus, the output of the apparatus is connected to a point in the circuit having a signal proportional to the volume of the particle producing the same only at the instant the particle is halfway through the aperture where the electric field is most uniform. The halfway point is the optimum position of the particle in the axial direction, hence the circuitry of the invention senses only particles which pass through on paths which are optimum with respect to the radial direction and it senses these particles at their axially optimum positions.

DESCRIPTION OF THE PREFERRED EMBODIMENT

Figure 5:
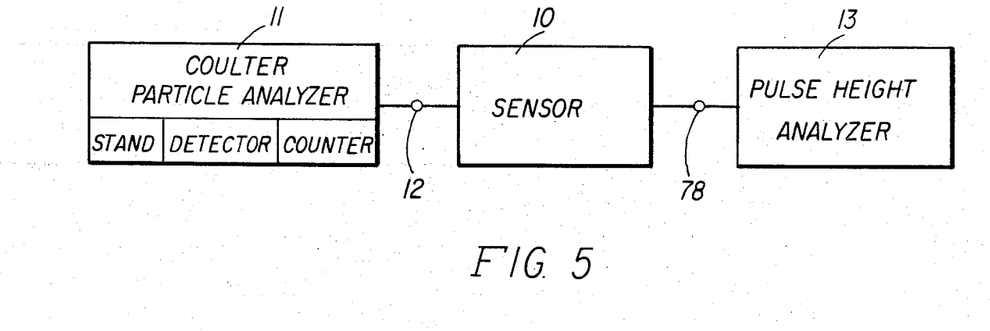
FIG. 5 is a block diagram of a system constructed in accordance with the invention and using an axial trajectory sensor.

A system constructed in accordance with the invention is illustrated in FIG. 5. The block 10 represents the sensor of the invention which will be described in some detail hereinafter. The block 11 comprises a Coulter particle analyzing apparatus which is normally composed of a stand, detector and counter. The stand includes the vessels, aperture tube, fluid system and electrodes of the apparatus. The detector includes circuitry which produces the particle pulses, and it includes connections with the electrodes that are disposed in the vessels of the stand. The counter may be any device which responds to the particle pulses, and may include pulse height discriminating means. It may be omitted in instances where only size studies are to be made, but is shown in the view in order to point out that since the sensor 10 will be discarding many pulses, it is best to make any counts prior to applying the particle pulses to the sensor 10. As seen, from the sensor 10 the output signals at 78 are applied to some form of pulse height analyzer 13 in order to make the sizing studies.

In the discussion which follows immediately, the differences between the several types of pulses produced by particles passing through an aperture will be explained. In this discussion, it may be taken that in every case the particles are identical in size. The differences in the configurations of their particle pulses are caused by the manner in which the particle passed through the aperture.

Figure 1:
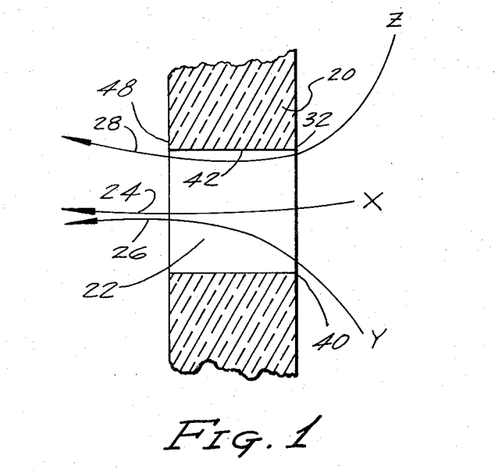
FIG. 1 is a diagrammatic view of the aperture of a Coulter particle analyzing apparatus showing the paths of different particles through the aperture.

FIG. 1 is a diagrammatic view of an aperture which constitutes the scanning means in the stand of the Coulter electronic particle analyzer 11. The aperture is in a wafer which in turn is mounted to an aperture tube, the tube being immersed in the sample liquid which is flowing through the aperture. The particles are suspended in the liquid and they are very much smaller in size than the aperture. In the view, no convention is used to illustrate the liquid, it being assumed that the liquid is present, in order to keep the illustration simple.

The wafer is formed of some material which will not readily abrade and which is insulating, such as corundum. It is shown in cross section at 20. The aperture 22 is bored in the wafer, the ratio of the length of the aperture and its diameter being approximately unity or in the vicinity of unity in the usual Coulter aperture tube. Those skilled in the art will have recognized, and it is specifically mentioned in the first and second copending applications, that a "long" aperture will produce results which are superior to short apertures insofar as size measurements are concerned, if the bandwidths of the associated amplifiers are reduced accordingly. Long apertures pose too many practical problems including loss of sensitivity, noise generation, microphonic modulation, increased coincidence, propensity to blocking, etc. Accordingly, long apertures (where the axial length is several times the diameter) are rarely used for particle work.

The sample suspension is passing through the aperture from right to left as indicated by the arrows on the particle paths. Three particle paths X, Y and Z are illustrated in FIG. 1 at 24, 26, and 28 respectively. These paths are deliberately chosen to be different for purposes of illustration, and the signals or particle pulses which are produced as a result of such passages are shown respectively on the identical time base in FIG. 2 at graphs X, Y and Z. The particles are assumed to be of identical size, as stated above.

The particle path X is almost coaxial with the aperture 22 along the path 24. The speed of the liquid passing through the aperture at this point is maximum and the current density distribution along this path changes smoothly. Accordingly, the resulting particle pulse 30 in FIG. 2, as shown in the graph X, is a simple bell-shaped pulse whose duration is proportional to the length of the aperture from $t_1$ to $t_2$ and whose amplitude X is quite closely proportional to the size of the particle. It will be noted that the beginning and end of the pulse 30, which are referred to as skirts, are not as easily defined as other dimensions of the pulse. The effective length of the aperture 22 is somewhat greater than its physical length because of a slight bulging of equipotential surfaces and hence the effective electric field extends somewhat out of the ends of the aperture. The particles will thus be coming within the influence of this field slightly before they actually enter the physical aperture. The current distribution throughout the suspension depends upon the location of the equipotential lines or rather surfaces. The sharp corners of the conventional aperture distort the field and produce regions of high current density at such corners. The particle which passes through the center of the aperture along the path 24 is least influenced by such regions of high current density and hence when the most uniform portion of the field is passed, which is at the axial center of the aperture between its ends, the particle pulse 30 produces its peak.

Figure 2:
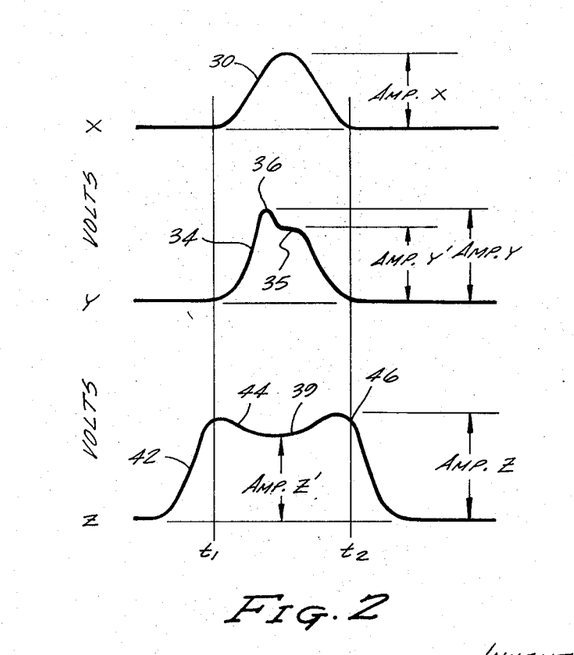
FIG. 2 is a diagram showing the graphs of particle pulses resulting from the passage of the particles of FIG. 1 along the paths shown in the aperture.

The particle path 26 of particle Y passes through the aperture on a beginning track which carries it quite close to the corner 40 but thereafter the path seems to align with the axis of the aperture 22. The resulting particle pulse which is produced is shown in graph Y and consists of the pulse 34 which has a peak or overshoot 36 on its leading edge which is at an amplitude Y, much higher than the amplitude X. It will be recalled that identical size particles are assumed. Examining the duration of this particle pulse, it is seen that it has substantially the same duration as the particle pulse 30, from the time $t_1$ to the time $t_2$. On the basis of duration alone, the axial trajectory sensors of the first and second copending applications would pass this pulse, but the false amplitude Y would cause it to decrease the accuracy of any information obtained in a pulse height analyzer such as 13.

The pulse 34 subsides from its first peak 36 to a relatively flat portion 35 in the center of the pulse. This is the point in time that the particle causing the path 26 is passsing through the axial and radial center of the aperture 22 where the electric field is most uniform and at a maximum, excluding the corner regions of high current density. The amplitude Y' at this point is equal to the amplitude X of graph X. If the output of the sensor 10 is related to this amplitude instead of to the false amplitude Y, the information it provides will be proper and give a true picture of the size of the particle which produced the original particle pulse. The invention accomplishes this relation.

The particle path 28 of the particle Z passes through the aperture 22 on a beginning and ending track which carries it quite close to the entrance and exit corners 32 and 48 where, as explained, the current density is abnormally high. Additionally, it passes quite close to the wall 42 where the speed of flow of the suspension through the aperture 22 is much slower than in the axial center. Accordingly, the pulse 43 which results from the passage of the particle Z and which is shown in graph Z in FIG. 2 has the peaks or overshoots 44 on its leading edge and 46 on its trailing edge. In addition, the duration of this particle pulse 42 is substantially greater than the durations of the particle pulses 30 and 34. The amplitude of the pulse 42 is shown in FIG. 2 graph Z to be greater than the amplitude X or Y'. This is a false amplitude, the more accurate amplitude being that in the center of the pulse at Z'. This pulse will, however, be rejected in any event because of its greater than normal duration. The operation of the circuitry to find the center of the pulse is of no consequence in this case. It will be noted that the flat portion 39 of the pulse 42 is quite broad in such a long pulse. It has been found that for pulses of this type the operation of the center finder circuitry is not sufficiently accurate to warrant retaining a pulse of this kind. Accordingly, its discarding is in the best interests of preserving accuracy of the information passed to the pulse height analyzer 13.

Figure 3:
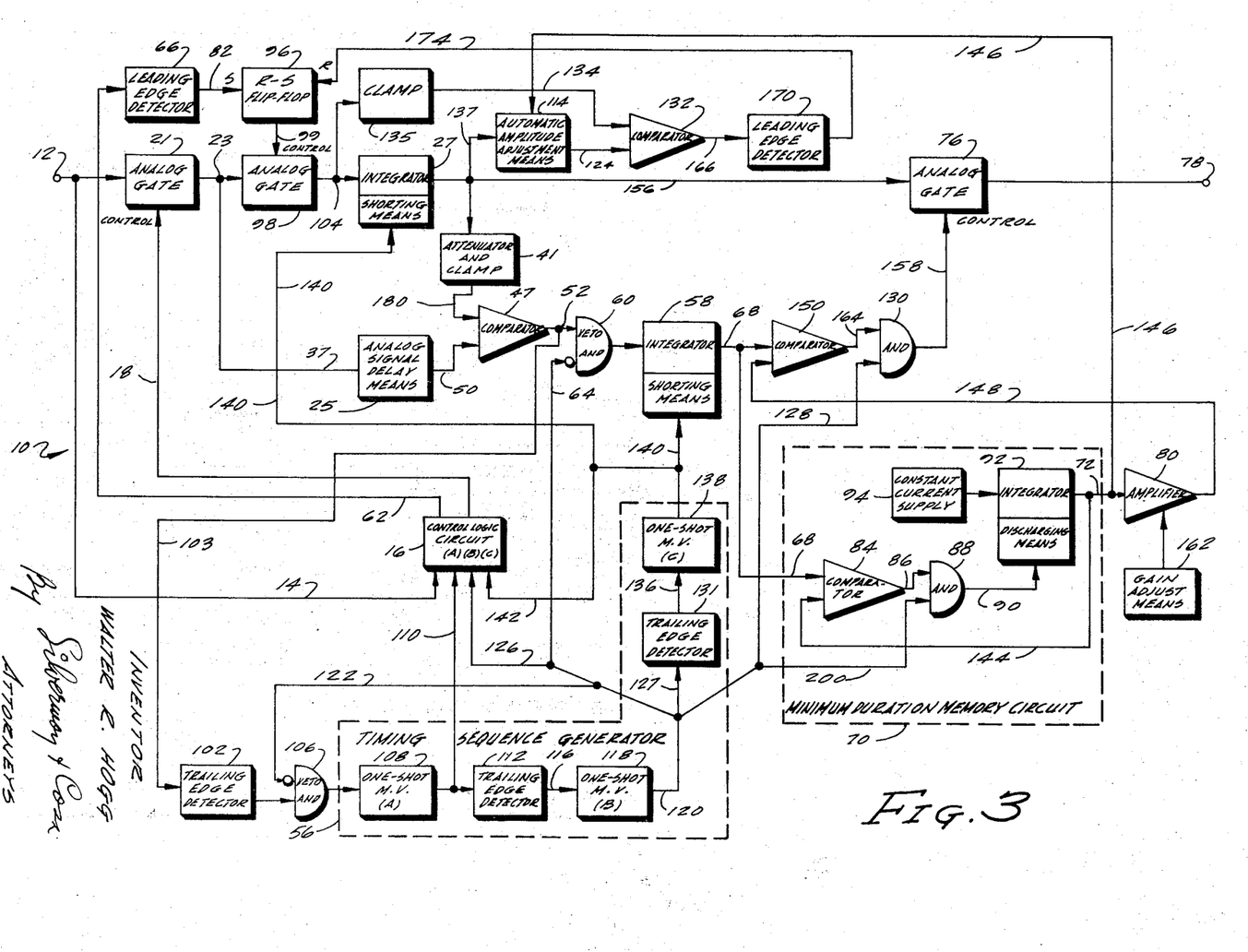
FIG. 3 is a block diagram of an axial trajectory sensor constructed in accordance with the invention.
Figure 4:
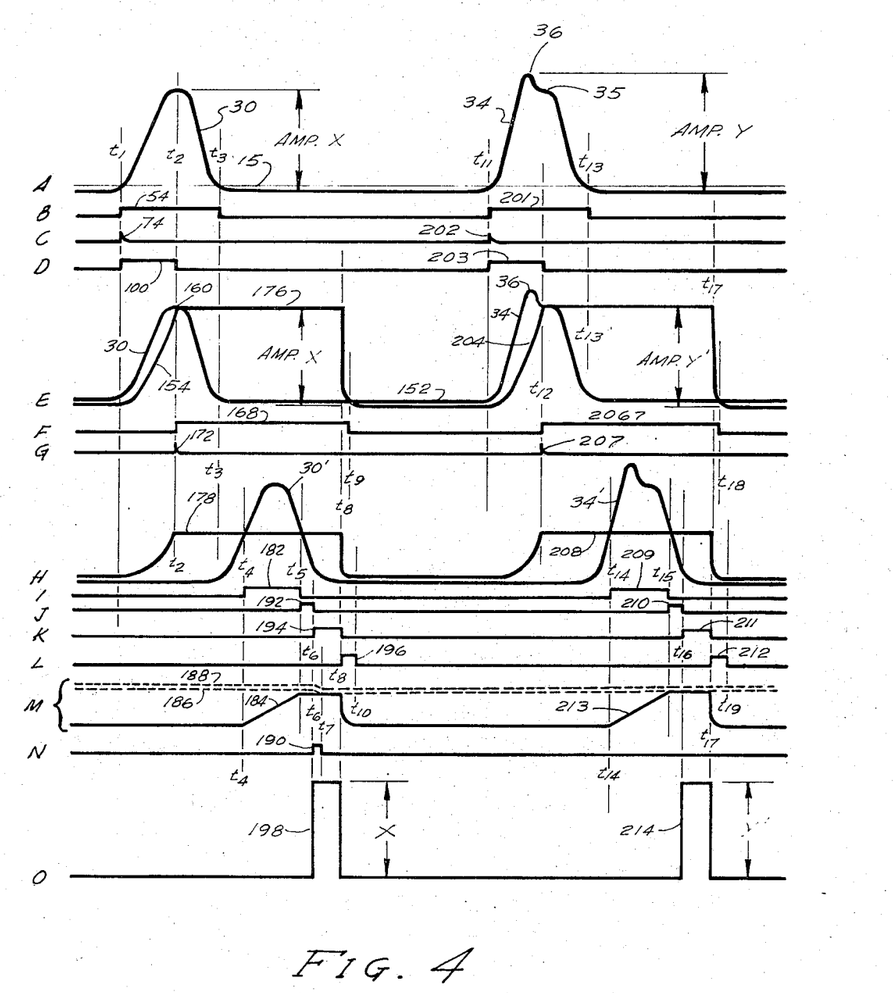
FIG. 4 is a diagram consisting of a series of graphs all on the same time scale illustrating various wave shapes throughout the sensor of FIG. 3 resulting from the processing of two particle pulses therein.

Inviting attention now to FIGS. 3 and 4, in FIG. 3 there is illustrated in block diagram an axial trajectory sensor 10 constructed in accordance with the invention, and in FIG. 4 there are illustrated graphs of the wave shapes throughout the various locations of the sensor 10, all shown on a common time scale. The construction and operation of the sensor 10 is quite similar to the construction and operation of the circuits disclosed and claimed in the second co-pending application, but differs in the addition of the means for finding the center of the particle pulse.

The input terminal 12 receives a train of particle pulses from the Coulter particle analyzer 11 and passes them to the analog gate 21 and the control logic circuit 16, reference being had to the second co-pending application for the details of this latter circuit. As shown in FIG. 4, two pulses are considered in order to explain the operation of the sensor 10, these being in the graph A of FIG. 4 at 30 and 34, chosen to be the same as the pulses 30 and 34 of graphs X and Y of FIG. 2. The pulse 30 has been produced by a particle X passing through the aperture 22 along the path 24 and the particle pulse 34 has been produced by a particle Y passing through the aperture along the path 26. The pulse 34 has a peak 36 occurring just after the start of the leading edge and subsides to the flat portion 35 in the center of the pulse as the particle Y is passing through the uniform field that exists at the center location between the axial ends of the aperture 22.

According to the understanding of the manner in which the aperture 22 responds to the passage of the particles, the duration of the two pulses 30 and 34 depends upon the time spent by the respective particles in the effective field of the aperture. It is understood from the disclosures of the co-pending applications how particle pulses whose durations are greater than those of the particles which spend the minimum amount of time in the aperture can be discarded by the circuitry. In this instance, therefore, it is assumed that the two particle pulses 30 and 34 have approximately the same duration, that is, the times $t_1$ to $t_3$ and $t_{11}$ to $t_{13}$ are substantially the same. Accordingly, the duration discriminating action of the sensor 10 should respond by passing both of these pulses to the output terminal 78, but it is seen that the amplitude Y is substantially greater than the amplitude X although the particles X and Y are assumed to be identical. It is only because of the passage of the particle X through a location of high current density that it carries a false peak 36. The amplitude of the center of the pulse 34 occurring at 35 is more closely its true amplitude Y' and according to the invention, the eventual derived signal or pulse which appears at the terminal 78 in response to the original pulse 34 will have the amplitude Y'.

Considering now the processing of the pulse 30, it appears at the terminal 12 and is applied by way of the line 14 to the control logic circuit 16 which includes a low threshold level 15 to prevent operation of the sensor on noise. For the time $t_1$ to $t_3$ that the pulse 30 exceeds the low threshold level 15 there is a signal output on the path 62 which may be considered a logic "one." This is represented by the rectangular signal 54 in graph B of FIG. 4. The signal 54 is differentiated and rectified by the leading edge detector 66 to produce a short trigger pulse 74 at the time $t_1$ on the path 82. The trigger pulse 74 is shown in graph C of FIG. 4. This trigger pulse 74 is used to set the R-S flip-flop 96 which in turn applies the appropriate voltage to the analog gate 98 by way of the line 99. The control signal from the R-S flip-flop 96 is a rectangular wave 100 between the times $t_1$ and $t_2$ shown in graph D of FIG. 4. The duration of this rectangular wave 100 is controlled by structure which resets the flip-flop 96, as will be explained. The control logic circuit 16 at the same time turns on the analog gate 21 so that the particle pulses which appear at 12 pass to the terminal 23 and thence by way of the line 37 to the analog signal delay means 25, while at the same time passing through the analog gate 98 to the integrator 27 by way of the path 104.

With the analog gates 21 and 98 both on, the integrator 27 commences to accumulate charge, its rate of accumulation depending upon the size of the particle. The automatic amplitude adjustment means 114 at the output terminal 156 of the integrator 27 has been adjusted so that when a particle is halfway through the aperture, the voltage of the path 124 is equal to the amplitude of the original particle pulse 30 which also arrives at the comparator 132 by way of the path 134 through the clamp circuit 135 from the terminal 104. At this instant, the voltage at the paths 137 and 124 is steadily increasing while the voltage on the path 134 is momentarily constant, the latter representing the particle passing through the uniform current density location in the center of the aperture between its ends.

The adjustment means 114 need not be automatic but could be manually adjusted to some characteristic which scales the output of the integrator to give the desired results. The automatic amplitude adjustment means 114 preferred is a commercially available component which performs the desired function. This can be an analog multiplier such as one sold by Motorola, Inc. under their catalog number MC1595L converted to act as a divider. Detailed instructions for this conversion are found in *The Micro-electronics Data Book*, 2nd edition, published by that company. The quasi-D.C. voltage appearing at 72 is proportional to the duration of the shortest particle pulses passed through the sensor 10 as described in the second copending application, these being the particle pulses with the ideal configuration of a particle following an axial path through the aperture 22. Thus, this voltage is used by way of the line 146 to adjust the transmission of the automatic amplitude adjusting means. This is done by dividing the voltage at 137 by the voltage at 146. Thus, the output of the integrator 27 appearing at 137 is connected to the "numerator" input of the divider or amplitude adjustment means 114 and the voltage on the line 146 is connected to the "denominator" input. When this is done, if for instance the aperture size and flow rate are changed to make the resultant particle pulses half as long due to twice the speed of flow, the voltage at 146 will be half of its former value and the voltage at 124 will rise twice as fast, reaching the same instantaneous voltage in half the time as formerly. This is in accordance with the requirements set forth.

When the voltages at the paths 134 and 124 pass through equality at the time $t_2$, the output of the comparator 132 changes state. Up to this time, it has been held in its standby state with no output, because of the clamp circuit 135. The latter is essentially a diode and a low impedance voltage source which prevents the voltage on the path 134 from decreasing all the way to the baseline. This is shown in the waveforms of the graph E of FIG. 4, being designated 152. Graph E illustrates what has just been described. The signal appearing at 134 is essentially the same as the particle pulse 30 and hence is designated 30 in Graph E. The adjusted output of the divider 114 appearing at 124 is represented by the steeply rising waveform 154 and the point at which the two voltages are equal occurs at the time $t_2$ and is designated 160, at the peak of the pulse 30. At this point the comparator 132 produces an output at 166 which is represented by the logic "one" signal 168 of graph F. This signal 168 is applied to the leading edge detector 170 to produce the trigger pulse 172 of graph G of FIG. 4. This trigger pulse 172 in turn is applied by way of the line 174 to the reset input of the R-S flip-flop 96 thereby resetting the flip-flop 96 and bringing the rectangular wave 100 of graph D to an end at time $t_2$. The gate 98 will then be closed but the integrator 27 has at this time completed its function.

When the analog gate 98 is turned off, the integrator 27 retains its charge and its output remains at a voltage level which is equal to the maximum value achieved. That voltage level is equal to the amplitude of the particle pulse 30 when the pulse was halfway through the aperture. The resulting wave form is shown at 176 in graph E. It is applied to the attenuator and clamp 41 which decreases its amplitude to some predetermined fraction of the original amplitude of waveform 176, resulting in the attenuated wave 178 of graph H OF FIG. 4 appearing at the input terminal 180 of the comparator 47. In the meantime, the original particle pulse 30 appearing at 23 has been applied by way of the line 37 to the analog signal delay means 25 so that a delayed signal appears at the other input terminal 50 of the comparator 47. The delayed signal is shown at 30' in graph H of FIG. 4. The comparator 47 is the usual type of differential amplifier but is connected and arranged so that there will be no output at 52 unless the voltage on the input 50 exceeds the voltage on the input 180. As a result, there will be a signal output only when the pulse 30' exceeds the attenuated wave 178, and this occurs between the times $t_4$ and $t_5$ as shown, the output from the comparator 47 being the rectangular pulse 182 of the graph I of FIG. 4.

The analog signal delay means can be any kind of delay structure including delay lines, etc. It will include amplifier means in case there is any deterioration of the pulse 30 while being delayed, in order that the output at 50 be as close to the original pulse 30 as possible. Alternatively to providing amplification in 25, the attenuation of attenuator and clamp 41 may be increased by the same factor.

The voltage at the output 156 of the integrator 27 is stored beyond the time $t_5$ until the circuitry of the sensor 10 has had sufficient time to ascertain whether the particle pulse was sufficiently short to represent a particle on a reasonably axial trajectory. This is done in a manner explained below. It should be remembered that the waveform of the signal 176 which is passed to the analog gate 76 by way of the line 156 does not have an amplitude equal to the amplitude of the original particle pulse 30, as was the case in connection with the structure of the second co-pending application, but instead, its amplitude is equal to the amplitude which was reached by the original particle pulse when it was halfway through the aperture 22. It so happens that in the case of a desirable pulse such as 30, the amplitude of the waveform 176 is the same as the amplitude of the pulse, as indicated by the amplitude X shown in graph E, but in the case of the pulse 34, this is not so.

The rectangular pulse 182 of graph I between the times $t_4$ and $t_5$ comprises the duration-measuring pulse which ascertains the duration of the particle pulse 30 at its fractional amplitude, the fraction being arbitrarily chosen in this example as 50 percent. In other words, the attenuated signal 178 has half the amplitude of the waveform 176, the latter having the amplitude of the pulse 30 at its center. This duration-measuring pulse 182 is applied to the integrator 58 through the veto-AND gate 60, and assuming that the gate is open, the rectangular pulse 182 will cause the integrator 58 to produce the ramp and plateau output pulse 184 at the input line 68 to the comparator 150. The minimum duration memory circuit 70 assumes a voltage output at 72 from the integrator 92 which is representative of the duration of the shortest pulses coming through the sensor 10. This voltage output is represented by the broken line 186 of graph M. The upper broken line 188 adds a tolerance which is set into the circuitry by means of the amplifier 80, adjusted by the gain adjust means 162.

When the integrated pulse 184 is formed, its ramp will rise to an amplitude which is representative of the duration of the duration-measuring pulse 182, and thereafter its voltage output will remain on a plateau equal to the amplitude reached by the ramp. If the amplitude of the pulse 184 does not exceed the level 188, there will be a short pulse 190 produced by the comparator 84, passed through the AND gate 88 to the line 90 and used to short the integrator 92 bringing its voltage output level 186 to the same amplitude as that of the ramp and plateau pulse 184. This causes the slight drop in the broken lines 186 and 188 shown between the times $t_6$ and $t_7$ and establishes the new level against which the next ramp and plateau pulse will be compared. The constant current supply 94 supplies a slight current to the integrator 92 to compensate for leakage and cause a very slow continuous rise. This rise is very little and is exaggerated in graph M.

Reverting now to the duration-measuring pulse 182, this pulse at the same time as being applied to the veto-AND gate 60 is also applied to the trailing edge detector 102 by way of the line 103, the output of the trailing edge detector 102 being a trigger pulse at the time $t_4$ which passes through the veto-AND gate 106 to the first component of the timing sequence generator 56. This component is the one-shot multi-vibrator 108 that produces a rectangular wave from time $t_5$ to $t_6$ at the line 110 which is the pulse 192 of graph J of FIG. 4. This pulse has its trailing edge detected in the detector 112 so that a trigger pulse appears at the time $t_6$ at 116, operating the one-shot multivibrator 118 to produce a rectangular pulse 194 between the times $t_6$ and $t_8$ on the lines 120, 122, 127, 128, 126, 64 and 200. The effect of the pulses on the lines 110, 126 and later on the line 142 is to prevent pulses from entering the sensor 10 while a previous pulse is being processed. Thus, partial pulses produced by having one pulse following quickly after another cannot affect the sensor.

The rectangular pulse 194, shown in graph K of FIG. 4 is the strobing pulse which controls the output of the sensor 10. It has several other functions as well. It places a signal at the input 64 of the veto-AND gate 60 and closes that gate at the time $t_6$. Its trailing edge is detected in the detector 131 producing a trigger pulse on line 136 at the time $t_8$ which produces a rectangular output pulse 196 (graph L) that appears on the line 140 to short the integrator 27 and the integrator 58. The pulse 194 also closes the veto-AND gate 106 by way of the line 122. The integrators 27 and 58 both commence their discharge at the time $t_8$, the pulse 196 continuing until the time $t_{10}$ to assure complete discharge of the condensers of the integrators.

The rectangular pulse 194 is applied to the AND gate 130 by way of the line 128, and if there is a signal on the input 164 during this time $t_6$ to $t_8$ there will be a strobing action during this time to open the analog gate 76. If this occurs, the strobing pulse 194 will excise a portion of the pulse 176 producing at the output terminal 78 a pulse or signal 198 between the times $t_6$ and $t_8$ whose amplitude is the same as that of the signal 176 and whose duration is always the same as the duration of the rectangular pulse produced by the one-shot multivibrator 118.

The strobing pulse 194 appears at the line 200 which is the input to the AND gate 88 of the minimum duration memory circuit 70 after the output from the integrator 58 ceases increasing. It thus occurs when the plateau has been formed. If, at this time, the voltage at 68 is less than the voltage at 144, this latter being the voltage of the output 72 of the integrator 92 represented by the broken line 186, then the comparator 84 has an output at 86 which combines with the signal at 200 to produce an output at 90. This output is the small pulse 190 previously described, occurring between the times $t_6$ and $t_7$. As explained, when this happens, the discharging means of the integrator 92 is energized, decreasing the voltage output. This discharging means contains enough resistance or is otherwise designed to slow the discharge rate to a speed enabling comparator 84 to terminate the fall of 186 at time $t_6$ without significant overshoot. When the voltage of the integrator 92 falls below the voltage represented by the plateau of the pulse 184, the output of the comparator 84 disappears, removing the energizing signal from the AND gate 88 and the shorting means input 90 causing the integrator 92 to hold at the new value, with leakage being replenished by the source 94.

If the pulse 184 had been larger than the voltage at 144, the comparator 84 would not have had an output and the discharging means of the integrator 92 would not have been activated. The voltage 186 and 188 would not have been affected and there would be no output signal 190.

There will be a signal at 164 out of the comparator 150 all the time that the input voltage at 68 is less than the voltage at 148. Since the duration of duration-measuring pulse 182 is less than the maximum duration established by the level of the voltage 188, and this occurs as it does during the time of the strobing pulse 194, between the times $t_6$ and $t_8$, the AND gate 130 has two inputs and passes the strobing pulse 194 to open the gate 76 and provide the output signal 198. If the voltage at 68 had been greater than the voltage at 148 the AND gate 130 would not have received an input on line 164 between times $t_6$ and $t_8$.

The analog gate 21 prevents the sensor 10 from being turned on and made receptive to a new signal from the input terminal 12 unless the instantaneous voltage at the input terminal has dropped below a certain threshold. This is explained in detail in the second co-pending application.

The next pulse which will be described is the pulse 34, representing a particle Y which passed through the aperture 22 on the path 26. It came near the edge 40 at the entrance to the aperture but was swept through the aperture thereafter on a path which was nearly axial. This produced the characteristic overshoot 36 on its leading edge, but being short in duration, it will not be rejected on the basis of duration.

The same sequence of events ensues. The pulse 34 exceeds low threshold 15 between the times $t_{11}$ and $t_{13}$ and the control logic circuit 16 therefore produces the signal 201 between those times; the leading edge detector 66 produces the trigger pulse 202 at the time $t_{11}$ setting the R-S flip-flop 96 and thereby producing the rectangular pulse 203; the analog gate 98 is opened; the pulse 34 passes to the integrator and the integrator output follows the pulse configuration 204 shown in graph E. This operation of the integrator is a little faster than previously because of the area of the peak 36; hence the interval between the times $t_{11}$ and $t_{12}$ is a little less than the corresponding interval between the times $t_1$ and $t_2$. Since the pulse 34 is fairly flat near its center, this has very little influence on the voltage at the instant of equality. As a result, the amplitude Y' is very nearly equal to the amplitude X even though the maximum amplitudes of the two pulses 30 and 34 were appreciably different.

Once the amplitude Y' has been stored, operation is the same as previously described. The comparative wave shapes are as shown: the pulses 206 to 214 are the equivalents of the pulses 168, 172, 178, 182, 192, 194, 196, 184 and 198, respectively.

The half-height duration of the pulse 34 is almost the same as the half-height duration of the pulse 30. As a result, the duration-measuring pulses 182 and 209 are practically the same and the ramp and plateau pulses 184 and 213 rise to nearly the same amplitude. Since the pulse 213 does not exceed the voltage level at the path 148, assuming that 34 was the very next pulse after the pulse 30, the comparator 150 never changes state the input polarities being chosen so that it will put out a continuous signal unless the voltage at 68 is higher than the voltage at 148) and the strobe pulses from the one-shot 118 are applied to the analog gate 76 and the output receives the pulse 214. There is no discharge of the integrator 92 and so there is no pulse equivalent to the pulse 190 in graph N. The minimum duration memory circuit 70 merely established the level 188 on the basis of the duration of the duration-measuring pulse 182 of the pulse 30.

From the above explanation, it is seen that the center finder portion of the sensor does not distinguish between particle pulses which have undesirable duration characteristics. The sensor 10 is required to make the distinction between the pulses of normal duration and those of greater than normal duration irrespective of whether they have false peaks. The center finder portion of the circuitry is not as accurate on larger duration pulses of the type shown at 42 of FIG. 2 and hence it is best that these be discarded in any event. As a result, the quality of the signals such as 198 and 214 which are produced at the output terminal 78 and which are derived from particle pulses passing approximately on axial trajectories through the aperture is much better than that of those output signals which would be obtained from a sensor which had only the duration discriminating means or the center finding means.

Considerable variation is capable of being made in the structure of the invention without departing from its spirit or scope as defined in the appended claims. For example, any of the duration discriminating means of the two co-pending applications could be incorporated into circuitry which includes the center finder means in order to improve the quality of signals used in size studies of particles.

What is desired and claimed to secure by Letters Patent of the United States is:

1. An axial trajectory sensor for use with a Coulter type paticle analyzing apparatus in which particles passing through an aperture produce desirable particle pulses whose amplitudes are most nearly proportional to their respective sizes when passing closest to an axial trajectory through said aperture and having thereby a certain approximate duration, and in which particles passing through said aperture on trajectories displaced from the axis will produce other particle pulses whose amplitudes are not necessarily proportional to their respective sizes and whose durations tend to be greater than said certain approximate duration but in certain instances may have said certain approximate duration; said sensor acting to respond to the desirable pulses and the first type of said other pulses which have said certain approximate duration but not to respond to the second type of said other pulses which have durations greater than said certain approximate duration and comprising:

A. input terminal means and output terminal means having a channel for passage of electrical signals between said terminal means with switch means in said channel to control the signals which appear at the output terminal means, the input terminal means adapted to have said desirable and other particle pulses applied thereto, B. means for finding the center of a particle pulse applied to said input terminal means and producing an artificial pulse whose amplitude is the amplitude of said applied particle pulse at said center, C. means for measuring the duration of said applied particle pulse at some predetermined fraction of the amplitude of said artificial pulse and deriving a duration-measuring pulse of constant amplitude and having the measured duration, D. means for converting said duration-measuring pulse into an electrical quantity whose value is proportional to the time duration of said duration-measuring pulse, E. means establishing an electrical effect of a standard equivalent to a maximum desired duration distinguishing between quantities produced by desirable pulses together with the first type of other pulses on the one hand and the second type of other pulses on the other hand, F. means comparing said electrical quantity with said standard and providing one type of energizing signal if the quantity does not exceed said standard and a second type of energizing signal if the said quantity does exceed the standard, and G. means for applying one of said types of energizing signals to the switch means of said channel to permit passage to said output terminal means of only electrical signals derived from said desirable particle pulses and the first type of said other pulses.

2. The sensor as claimed in claim 1 in which said establishing means includes a memory circuit responsive to the duration of a previous pulse of said certain approximate duration processed by said sensor to produce a voltage output comprising said standard.

3. The sensor as claimed in claim 1 in which said means for finding the center of a particle pulse comprises comparing circuitry for: receiving said particle pulse, generating the integral of said particle pulse commencing substantially at the beginning of said particle pulse, comparing the integral and particle pulse to find the time at which the amplitude of the integral and the amplitude of said pulse are equal, and disabling the integral generation at said time.

4. The sensor as claimed in claim 3 in which said comparing circuitry includes an integrator for generating said integral and means for maintaining the integrator output at the voltage achieved at said time for a substantial duration thereafter whereby to produce said artificial pulse.

5. The sensor as claimed in claim 3 in which said establishing means includes a memory circuit responsive to the duration of a previous pulse of said certain approximate duration processed by said sensor to produce a voltage output comprising said standard.

6. The sensor as claimed in claim 3 in which said center finding means includes means adjusting the relative amplitudes of the generated integral and a desirable pulse so that the time at which the integral and desirable pulse are equal in amplitude occurs at the center of the desirable pulse.

7. The sensor as claimed in claim 6 in which said amplitude adjusting means is automatic in operation.

8. The sensor as claimed in claim 6 in which said establishing means includes a memory circuit responsive to the duration of a previous pulse of said certain approximate duration processed by said sensor to produce a voltage output comprising said standard.

9. The sensor as claimed in claim 8 in which said amplitude adjusting means is connected to said memory circuit and automatically controlled by the said voltage comprising said standard.

10. The sensor as claimed in claim 9 in which the amplitude adjusting means is a divider functioning to divide the generated integral by the voltage comprising the standard.

11. The sensor as claimed in claim 1 in which the means for finding the center of the particle pulse comprises an integrator, a comparator having two input terminals, means for connecting the input terminal means to the integrator and one input terminal of said comparator to apply incoming particle pulses to said comparator and integrator, means connecting the output of the integrator to the second input terminal of said comparator including means adjusting the amplitude of the output of the integrator so that when a particle pulse of said certain approximate duration is applied thereto the adjusted integrator output will reach the same amplitude as the center of a desirable particle pulse at the center of said desirable particle pulse, the comparator being arranged to stop the integrating operation of the integrator when the amplitude of the same pulse being applied to the integrator and the amplitude of the adjusted integrator output are equal.

12. The sensor as claimed in claim 11 in which said integrator is in said channel and the circuitry is arranged that said integrator maintains the maximum amplitude it reaches for a period of time thereafter whereby to generate said artificial pulse in said channel.

13. The sensor as claimed in claim 11 in which the amplitude adjusting means is automatic in operation.

14. The sensor as claimed in claim 11 in which the means connecting said input terminal means to said integrator includes a gate through which said incoming particle pulses must pass to be applied to said integrator, said gate being normally closed but adapted to be opened by the leading edge of an incoming pulse, the comparator producing an output signal when the amplitude of the incoming pulse and the adjusted integrator output are equal and said output signal being applied to means closing said gate whereby the output of said integrator will be held at said adjusted amplitude thereafter.

15. The sensor as claimed in claim 14 in which said integrator is in said channel and the held adjusted amplitude comprises said artificial signal.

16. The sensor as claimed in claim 15 in which said integrator is connected to be discharged after the said electrical quantity has been compared with said standard whereby to make the said integrator ready to receive a following particle pulse.

17. The sensor as claimed in claim 11 in which said establishing means includes a memory circuit responsive to the duration of a previous pulse of said certain approximate duration processed by said sensor to produce a voltage output comprising said standard.

18. The sensor as claimed in claim 17 in which said amplitude adjusting means is connected to said memory circuit and automatically controlled by said voltage comprising said standard.

19. The sensor as claimed in claim 18 in which the amplitude adjusting means is a divider functioning to divide the output of said integrator by the voltage comprising the standard.

20. An axial trajectory sensor for use with a Coulter type particle analyzing apparatus in which particles passing through an aperture produce desirable particle pulses whose amplitudes are most nearly proportional to their respective sizes when passing closest to an axial trajectory through said aperture and having thereby a certain approximate duration, and in which particles passing through said aperture on trajectories displaced from the axis will produce other particle pulses whose amplitudes are not necessarily proportional to their respective sizes and whose durations tend to be greater than said certain approximate duration but in certain instances may have said certain approximate duration; said sensor acting to respond to desirable pulses and the first type of said other pulses which have said certain approximate duration but not to respond to the second type of other pulses which have durations greater than said certain approximate duration and comprising:
  A. input terminal means and output terminal means having a channel for passage of electrical signals between the terminal means with switch means in said channel to control the signals which appear at the output terminal means, the input terminal means adapted to have said desirable and other particle pulses applied thereto,
  B. means for finding the center of a particle pulse applied to said input terminal means and producing an artificial pulse whose amplitude is the amplitude of the said applied particle pulse at said center,
  C. means for measuring the duration of said applied particle pulse at some predetermined fraction of the amplitude of said artificial pulse and deriving a duration-measuring pulse of constant amplitude and having the measured duration,
  D. means for converting said duration-measuring pulse into an electrical time signal pulse whose amplitude is proportional to the duration of said duration-measuring pulse,
  E. means for producing a voltage level representative of the amplitude of a comparable electrical time signal pulse which would be produced by a particle pulse having said certain approximate duration,
  F. means for comparing the amplitude of said first-mentioned electrical time signal pulse with said voltage level and providing a first type of energizing signal if the amplitude of the first-mentioned electrical time signal pulse does not exceed said voltage level and a second type of energizing signal if the amplitude of said first-mentioned electrical time signal pulse does exceed said voltage level,
  G. means for applying one of said types of energizing signals to the switch means of said channel to permit passage to said output terminal means of only electrical signals derived from said desirable pulses and the first type of said other pulses.

21. The sensor as claimed in claim 20 in which the means for producing said voltage level comprise a memory circuit capable of storing the comparable electrical time signal pulse produced by a prior particle pulse having said certain approximate duration and providing said voltage level for particle pulses being processed by said sensor after said prior particle pulse.

22. The sensor as claimed in claim 21 in which means are provided for modifying the relative magnitudes of the said voltage level and said first-mentioned electrical time signal pulse therewith to establish a predetermined tolerance enabling the production of the first type of energizing signal therefrom even if the resulting modified ratio of the first-mentioned electrical time signal pulse to the said voltage level exceeds unity to some extent.

23. The sensor as claimed in claim 22 in which the means for modifying the relative magnitudes of the said voltage level and said first-mentioned electrical time signal pulse comprises means for modifying said voltage level.

24. The sensor as claimed in claim 22 in which said means for finding the center of a particle pulse comprises comparing circuitry for: receiving said particle pulse, generating the integral of said particle pulse commencing substantially at the beginning of said particle pulse, comparing the integral and particle pulse to find the time at which the amplitude of the integral and the amplitude of the pulse are equal, and disabling the integral generation at said time.

25. The sensor as claimed in claim 24 in which said comparing circuitry includes an integrator for generating said integral and the integrator output is maintained at the voltage achieved at said time for a substantial duration thereafter whereby to produce said artificial pulse.

26. The sensor as claimed in claim 24 in which said center finding means includes means adjusting the relative amplitude of the generated integral and the particle pulse on the basis of a desirable pulse so that the time at which the integral and desirable pulse are equal in amplitude occurs at the center of the desirable pulse.

27. The sensor as claimed in claim 26 in which said amplitude adjusting means is automatic in operation.

28. The sensor as claimed in claim 27 in which said amplitude adjusting means is connected to said memory circuit and automatically controlled by the voltage level produced by said memory circuit.

29. The sensor as claimed in claim 21 in which said means for finding the center of a particle pulse comprises comparing circuitry for: receiving said particle pulse, generating the integral of said particle pulse commencing substantially at the beginning of said particle pulse, comparing the integral and particle pulse to find the time at which the amplitude of the integral and the amplitude of the pulse are equal, and disabling the integral generation at said time.

30. The sensor as claimed in claim 29 in which said comparing circuitry includes an integrator for generating said integral and the integrator output is maintained at the voltage achieved at said time for a substantial duration thereafter whereby to produce said artificial pulse.

31. The sensor as claimed in claim 29 in which said center finding means includes means adjusting the relative amplitudes of the generated integral and the particle pulse on the basis of a desirable pulse so that the time at which the integral and desirable pulse are equal in amplitude occurs at the center of the desirable pulse.

32. The sensor as claimed in claim 29 in which said amplitude adjusting means is automatic in operation.

33. The sensor as claimed in claim 32 in which said amplitude adjusting means is connected to said memory circuit and automatically controlled by the voltage level produced by said memory circuit.

34. The sensor as claimed in claim 20 in which said means for finding the center of a particle pulse comprises comparing circuitry for: receiving said particle pulse, generating the integral of said particle pulse commencing substantially at the beginning of said particle pulse, comparing the integral and particle pulse to find the time at which the amplitude of the integral and the amplitude of the pulse are equal, and disabling the integral generation at said time.

35. The sensor as claimed in claim 34 in which said comparing circuitry includes an integrator for generating said integral and the integrator output is maintained at the voltage achieved at said time for a substantial duration thereafter whereby to produce said artificial pulse.

36. The sensor as claimed in claim 34 in which said center finding means includes means adjusting the relative amplitudes of the generated integral and the particle pulse on the basis of a desirable pulse so that the time at which the integral and desirable pulse are equal in amplitude occurs at the center of the desirable pulse.

37. The sensor as claimed in claim 36 in which said comparing circuitry includes an integrator and the amplitude adjusting means are in the output of the integrator.

38. The sensor as claimed in claim 36 in which said amplitude adjusting means is automatic in operation.

39. The sensor as claimed in claim 20 in which the means for finding the center of the particle pulse comprises an integrator, a comparator having two input terminals, means for connecting the input terminal means to the integrator and to one input terminal of said comparator to apply incoming particle pulses to said comparator and integrator, means connecting the output of the integrator to the second input terminal of said comparator including means adjusting the amplitude of the output of the integrator so that when a particle pulse of said certain approximate duration is applied thereto the adjusted integrator output will reach the same amplitude as the center of a desirable particle pulse at the center of said desirable particle pulse, the comparator being arranged to stop the integrating operation of the integrator when amplitude of the same pulse being applied to the integrator and the amplitude of the adjusted integrator output are equal.

40. The sensor as claimed in claim 39 in which said integrator is in said channel and the circuitry is arranged that said integrator maintains the maximum amplitude it reaches for a period of time thereafter whereby to generate said artificial pulse in said channel.

41. The sensor as claimed in claim 39 in which the means connecting the input terminal means to said integrator includes a gate through which said incoming pulses must pass to be applied to said integrator, said gate being normally closed but adapted to be opened by the leading edge of an incoming pulse, the comparator producing an output signal when the amplitude of the incoming pulse and the adjusted integrator output are equal and said output signal being applied to means closing said gate whereby the output of the integrator will be held at said adjusted amplitude thereafter.

42. The sensor as claimed in claim 41 in which said integrator is connected to be discharged after said first-mentioned electrical time signal pulse has been compared with said voltage level whereby to make said integrator ready to receive a following particle pulse.

43. The method of processing particle pulses produced by a Coulter type particle analyzing apparatus in which particles passing through an aperture produce desirable particle pulses whose amplitudes are most nearly proportional to their respective sizes when passing closest to an axial trajectory through said aperture and having thereby a certain approximate duration, and in which particles passing through said aperture on trajectories displaced from the axis will produce other particle pulses whose amplitudes are not necessarily proportional to their respective sizes and whose durations tend to be greater than said certain approximate duration but in certain instances may have said certain approximate duration; said processing resulting in the discarding of all particle pulses having said greater durations and the production of output pulses derived from the desirable pulses and those other pulses having said approximate duration, comprising:

A. finding the center amplitude of each incoming particle pulse,

B. producing an artificial pulse whose amplitude is equal to said center amplitude and attenuating said artificial pulse to some predetermined fractional amplitude thereof, C. comparing said incoming particle pulse with said attenuated pulse and measuring the duration of said incoming particle pulse at said fractional amplitude and deriving therefrom a duration-measuring pulse, D. converting said duration-measuring pulse to a time signal pulse whose amplitude is proportional to the duration measured, E. generating a voltage level representative of substantially said certain approximate duration on the same scale as said time signal pulse, F. comparing the time signal pulse with said level and obtaining therefrom a first type of gating signal if the level is not exceeded and a second type of gating signal if the level is exceeded, and G. passing an output pulse having the amplitude of said artificial pulse and a predetermined duration in the event of the production of a gating signal of the first type, but blocking any output pulse in the event of the production of a gating signal of the second type.

44. The method as claimed in claim 43 in which the voltage level is generated by the use of a prior particle pulse having said certain approximate duration.

45. The method as claimed in claim 43 in which the center amplitude of each incoming pulse is found by generating the integral of said incoming pulse on a scale adjusted to cause said integral to equal the center of a desirable pulse if both said integral and desirable pulse were commenced at the same time.

46. The method as claimed in claim 45 in which the voltage level is generated by the use of a prior particle pulse having said certain approximate duration.

47. The method as claimed in claim 45 in which the scale is adjusted automatically by said voltage level.

48. The method as claimed in claim 47 in which the voltage level is generated by the use of a prior particle pulse having said certain approximate duration.

49. An axial trajectory sensor for use with a particle study apparatus in which particles pass through a detecting zone having an axis for producing particle pulses, the particles, when passing closest to an axial trajectory through the detecting zone, producing desirable particle pulses having amplitudes which are most nearly proportional to the respective sizes of the particles, and also thereby having a certain approximate duration, and in which particles passing through the detecting zone on trajectories displaced from its axis will produce first and second types of particles pulses having amplitudes which are not necessarily proportional to their respective sizes, said first type having said certain approximate duration and said second type having durations which tend to be longer than said certain approximate duration; said sensor being constructed with an input and arranged to respond to said desirable particle pulses and said other particle pulses of the first type in a first manner and to respond to said other particle pulses of the second type in a second manner and comprising:

A. means for finding the center of the particle pulse applied to the sensor input and producing an artificial pulse whose amplitude is the amplitude of the applied particle pulse at its center;

B. means for measuring the duration of a portion of a particle pulse applied to the sensor input and for deriving a duration-measuring pulse having the measured duration;

C. means for establishing an electrical standard equivalent to a maximum desired duration for the duration-measuring pulses;

D. means for comparing each said duration-measuring pulse with said standard and for providing a first type of energizing signal if said standard is not exceeded and a second type of signal if said standard is exceeded; and E. means coupled to receive said first and second types of signals for generating, respectively, the first and second manners of response.

* * * * *

UNITED STATES PATENT OFFICE
CERTIFICATE OF CORRECTION

Patent No. 3,783,390      Dated January 1, 1974

Inventor(s) Walter R. Hogg

It is certified that error appears in the above-identified patent and that said Letters Patent are hereby corrected as shown below:

Abstract line 10, change "meets" to -- meet --. Column 2, line 23. Change "proportional" to -- quite --. Column 9, line 18 change "OF" to -- of --. Column 10, line 4, change "the" to -- a --. Column 16, line 50, after "and" insert -- means for maintaining --; delete "is maintained". Column 17, line 10, after "and" insert -- means for maintaining --, delete "is maintained"; line 37 after "and" insert -- means for maintaining --, delete "is maintained".

Signed and sealed this 3rd day of December 1974.

(SEAL)
Attest:

McCOY M. GIBSON JR.
Attesting Officer

C. MARSHALL DANN
Commissioner of Patents